United States Patent [19]

Davis

[11] 3,836,006
[45] Sept. 17, 1974

[54] MEDIA FEED SYSTEM FOR A FILTRATION DEVICE

[75] Inventor: Steven S. Davis, Salt Lake City, Utah

[73] Assignee: Envirotech Corporation, Salt Lake City, Utah

[22] Filed: Mar. 16, 1973

[21] Appl. No.: 342,046

[52] U.S. Cl. ................................ 210/387, 210/401
[51] Int. Cl. ............................................ B01d 33/00
[58] Field of Search ...................... 210/387, 393, 401

[56] References Cited
UNITED STATES PATENTS

| | | | |
|---|---|---|---|
| 82,735 | 10/1868 | Merrill | 210/401 X |
| 2,016,991 | 10/1935 | Dollinger | 210/387 UX |
| 2,823,806 | 2/1958 | Harlan | 210/387 |
| 3,144,409 | 8/1964 | Jauhola | 210/401 X |
| 3,276,595 | 10/1966 | Houpillart | 210/401 |
| 3,421,297 | 1/1969 | Dahlem | 210/387 X |
| 3,437,210 | 4/1969 | O'Neill | 210/387 |

Primary Examiner—Granville Y. Custer, Jr.
Assistant Examiner—Craig R. Feinberg
Attorney, Agent, or Firm—Robert R. Finch; Robert E. Krebs

[57] ABSTRACT

Apparatus for feeding a lightweight continuous sheet of disposable filter medium from a large supply roll onto a rotary drum vacuum filter. The feeder includes at least one pair of endless gripper belts which are trained about rollers in face-to-face relationship to grip the disposable medium therebetween to carry it from the supply roll to the filter. The roll of filter medium is mounted in a fixed cradle, a press roller is mounted on levers to continually press against the roll of paper as it unwinds and one of the gripper belts passes over the press roll against the paper roll to unwind the filter medium and carry it into the nip between the gripper belts for delivery to and release at a location adjacent the filter. The press roller and its associated belt are arranged to contact a relatively large area of the supply roll thus effecting rotation of the supply roll to assist in unwinding.

4 Claims, 4 Drawing Figures

MEDIA FEED SYSTEM FOR A FILTRATION DEVICE

BACKGROUND OF THE INVENTION

1. Field of the Invention

This invention relates generally to rotary drum vacuum filters for separating solids from liquids and more particularly to filters employing a disposable filter medium as a precoat.

2. State of the Art

Rotary drum vacuum filters as well as horizontal belt filters are typically used for separating solids from liquids. Conventionally, such filters incorporate either a permanently fixed filter medium or a traveling endless band of filter medium upon which the filtered solids are collected. Since the filter medium is used again-and-again, such filters must include means to remove the solids and to clean the filter medium. To eliminate the problems of solids removal and filter media cleaning, it has been suggested that dispoable filter medium be used on such filters.

For a disposable media operation to be economical, however, the filter medium must be quite inexpensive. It is usually suggested that the medium comprise a lightweight, weak tissue or newsprint-type paper which is fed from a very large supply roll onto the filter. But, in using large supply rolls, the medium is apt to tear while being unwound or while being transported from the supply roll to the filter.

SUMMARY OF THE INVENTION

The present invention provides ways and means for unwinding and continuously feeding disposable filter medium from a large supply roll onto a filter, such as a rotary drum vacuum filter. Although not limited to such environments, it is especially useful with a so-called rotary drum vacuum belt filter which utilizes a carrier belt for supporting the disposable medium during the filtration and subsequent discharge. The system includes a means which cradles or partially wraps around the supply roll to unwind the filter medium therefrom and at least one pair of endless belts arranged face-to-face to have a common run between which the filter medium is gripped and carried from the supply roll to a point adjacent the filter surface where an array of fluid sprays direct the filter medium onto such surface where it is held during cake formation and drying. Thereafter, the disposable medium, now carrying a filter cake, is unwound from the filter and carried to a remote discharge by the carrier belt medium.

BRIEF DESCRIPTION OF THE DRAWINGS

The present invention may be further understood by referring to the following description and appended illustrations which are offered by way of example only and not in limitation of the invention, the scope of which is defined by the appended claims and equivalents and not by any description thereof. In the embodiment illustrated the invention is associated with a rotary drum vacuum belt filter. In the drawings:

FIG. 3 is enlarged and both FIGS. 3 and 4 are partly in section.

DETAILED DESCRIPTION OF THE PREFERRED EMBODIMENT

Figure 1:
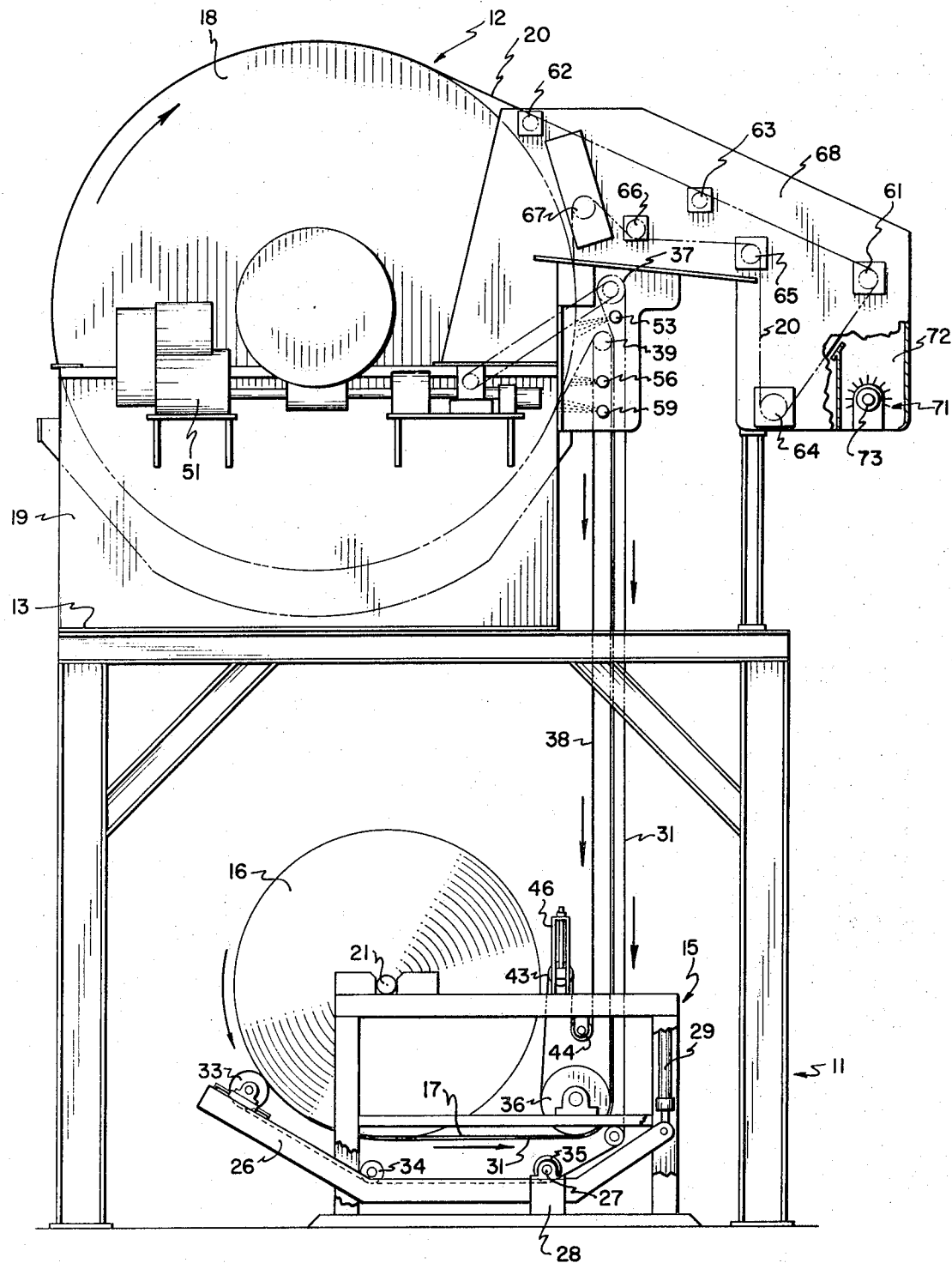
FIG. 1 is a side elevation of apparatus embodying the invention, certain parts being omitted for purposes of clarity.
Figure 2:
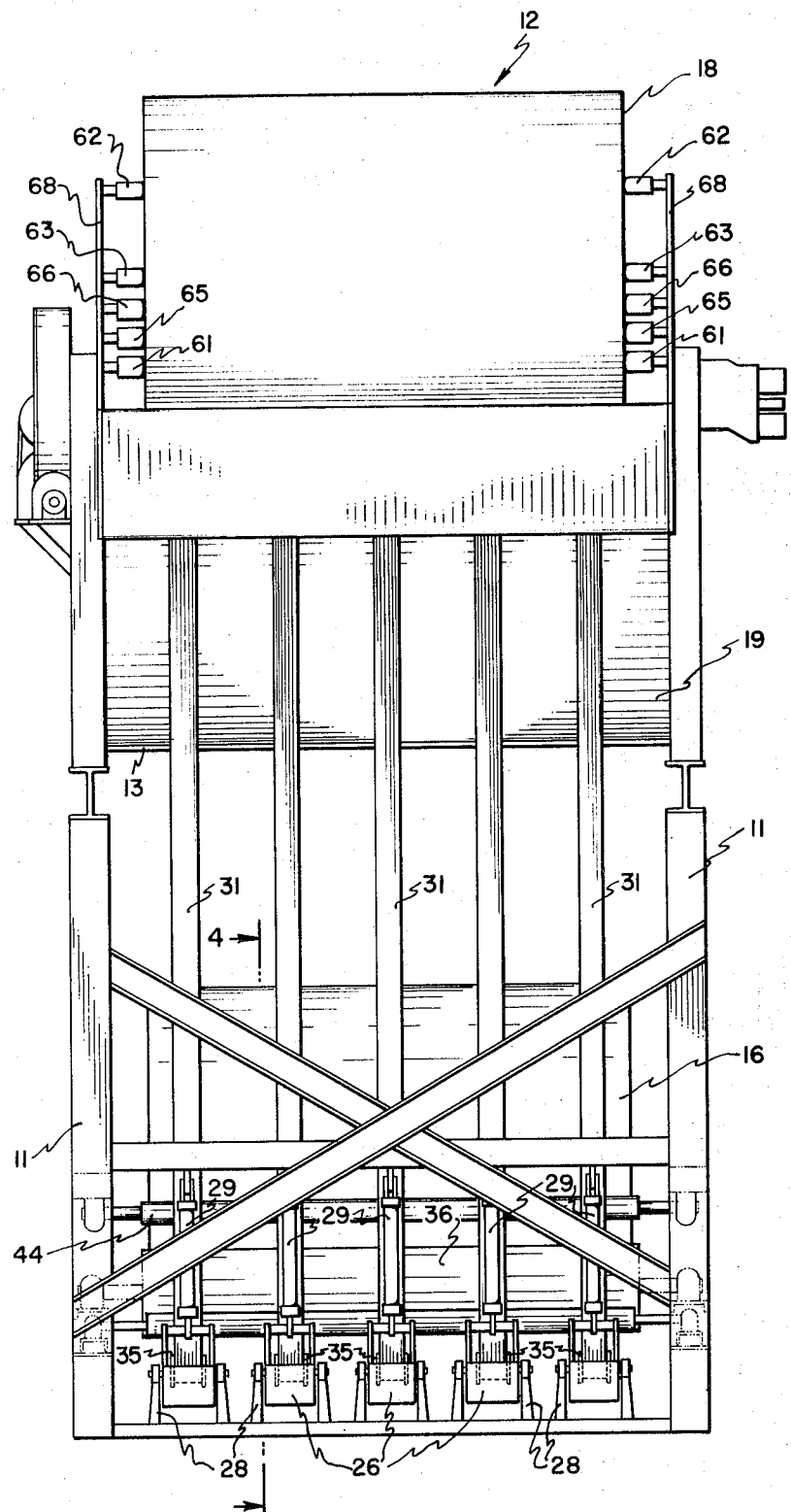
FIG. 2 is a front elevation of the apparatus shown in FIG. 1, again, certain parts have been omitted for clarity.

In FIGS. 1 and 2, a main frame 11 supports a rotary drum vacuum belt filter 12 on a platform 13 above a large supply roll 16 of disposable filter medium. The supply roll is supported to rotate freely on a horizontal axle 21 supported on stationary frame 9215.

According to the invention, the mechanism operates to continuously pick up disposable medium 17 from the supply roll 16 and feed it onto a carrier belt 20 which is trained about the drum 18 of the filter 12. The filter is completely conventional except in that it may utilize a modified belt 20 and the disposable medium. In a conventional arrangement where the carrier belt 20 serves as a filter medium, it would always be a relatively fine mesh material. However, in the arrangement according to the invention, the belt 20 need only be a lightweight belt of porous nylon or net fabric which alone would not be a suitable filter because it would pass too many solids. However, when the porous belt is overlain or precoated with the disposable filter medium, filtration will be very satisfactory.

Because the disposable filter medium is usually paper, the entire apparatus is sometimes referred to as a paper precoat filter. The paper may be newsprint or a lightweight tissue such as a single-ply creped wet strength tissue paper. Such paper is commercially available in very large rolls, for instance over five feet wide and four feet in diameter.

Figure 4:
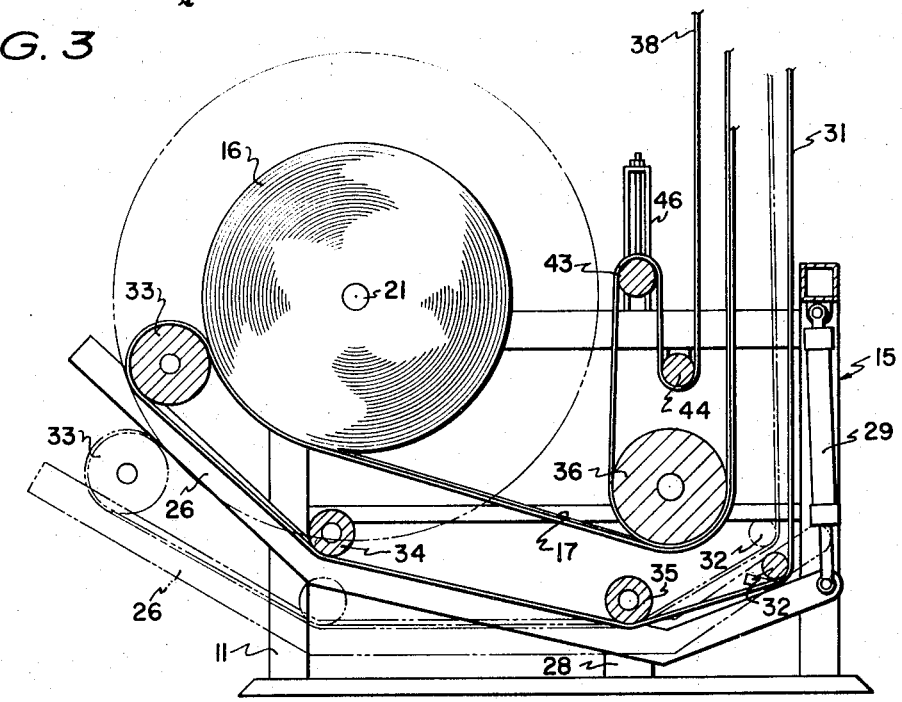

The paper feeding system generally comprises (1) a belt arrangement by which a first belt is partially wrapped around the supply roll, preferably around a lower portion in cradlelike fashion, thereby to rotate the roll to unwind the paper therefrom, (2) a second belt cooperative with the first belt to grip and carry the filter medium to a location adjacent the filter, and (3) means to separate the medium from the first and second belts for deposit onto the carrier belt of the filter. As best shown in FIGS. 1, 2 and 4, the medium pick-up arrangement comprises a plurality of spaced-apart lever members 26 mounted on coaxial pivot shafts 27 parallel to roll axis 21 on the frame 15 to extend beneath the paper roll perpendicular to the axis 21 of the supply roll.

The lever axles 27, which may be a single shaft, are supported by upright ears 28 fixed to the frame 15. Each of the levers 26 has a working end which extends from the fulcrum or pivot point towards and beneath the supply roll to terminate beyond the axis 21. The working end is preferably at least as long as the radius of the supply roll and, usually, is about equal to the supply roll diameter. It may also be bent as shown to facilitate wrap around. The other end of the lever, which may be relatively short, extends from the fulcrum away from the supply roll. Connected between this other end and the frame 15 are pneumatic or hydraulic rams 29 which, when extended push against the levers to force the free end of the levers and associated rollers 33, towards the supply roll with a predetermined force.

One or more first endless belts 31 are trained over rollers 33, 34 and 35 which are spacedly mounted along each of the levers 26 on axes transverse thereof. In the illustrated arrangement, outboard rollers 33 are rotatably mounted near the free end of the levers, rollers 35 are mounted at the fulcrums and the rollers 34 are mounted adjacent the centers of the levers. The spacing of the rollers is obviously a matter of choice so long as they fulfill their function, which is support and carry the first belt under the roll 16 then over roll 33 to return in a direction that is tangent to the roll 16 thence over an idler 36.

The idler drum 36 is mounted on the frame 15 to freely rotate about an axis parallel that of the supply roll. It is spaced above the levers and adjacent the other or the worked end thereof (connected to the ram) so that tension is maintained on the belts 31 when the levers 26 pivot. From the idler drum, the endless belts 31 run substantially vertically to a drive pulley 37 near the filter drum. The belts 31 are maintained fairly taut across the rollers so that when the levers 26 are pivoted by extension of the rams, the belts press against the supply roll and conform to its curvature. (FIG. 4 shows two positions which a lever 26 will assume as media is unwound from the supply roll 16, one position being shown in phantom lines.) To selectively tension the belt, the end rollers 33 may be mounted for adjustable positioning on the levers although generally the tension will be maintained by pressing the belts against the roll.

In operation, the first endless belts 31 travel in the direction indicated by the arrows so that the frictional engagement between the supply roll 16 and the upper surface of the upper runs of the belts wrapped about the roll unwinds the filter medium 17. The unwound filter medium is then carried along the belts 31 towards and into the nip between the first belts 31 and the second belt 38 at the idler drum 36.

One or more second belts 38 are trained around the idler drum and upper pulleys 39 mounted near the filter. The pulleys 39, which may be separately driven or rely on driving by rotation of the drum 36, rotate in the direction indicated by the arrows at the same speed as are the first belts. The second belts are spaced along the idler drum 36 so that each one runs face-to-face with a corresponding one of the first belts. To maintain tension on the second belts, associated idler rollers 43 are journalled in bearings in turn adjustably mounted in a bracket 46.

Drive pulley 37 and, if desired, pulley 39 is driven from a drive means (e.g., motor 51 and associated drive chain) supported on the filter. The illustrated motor 51 also drives the filter drum 18; accordingly, the speed of the filter medium supplied to the drum is readily synchronized with the drum speed.

The upper pulleys 37 for the first endless belts are mounted slightly above the upper pulleys 39 for the second belts so that when the filter medium sheet passes pulley 37, the medium is free to fall away from the first belts and turn toward the filter 12. In this connection, the upper pulley 37 may be offset slightly towards the filter drum or it may be slightly larger in diameter than the other pulleys as shown in FIG. 1 to enhance the frictional engagement between the belts at the upper end of their run.

Figure 3:
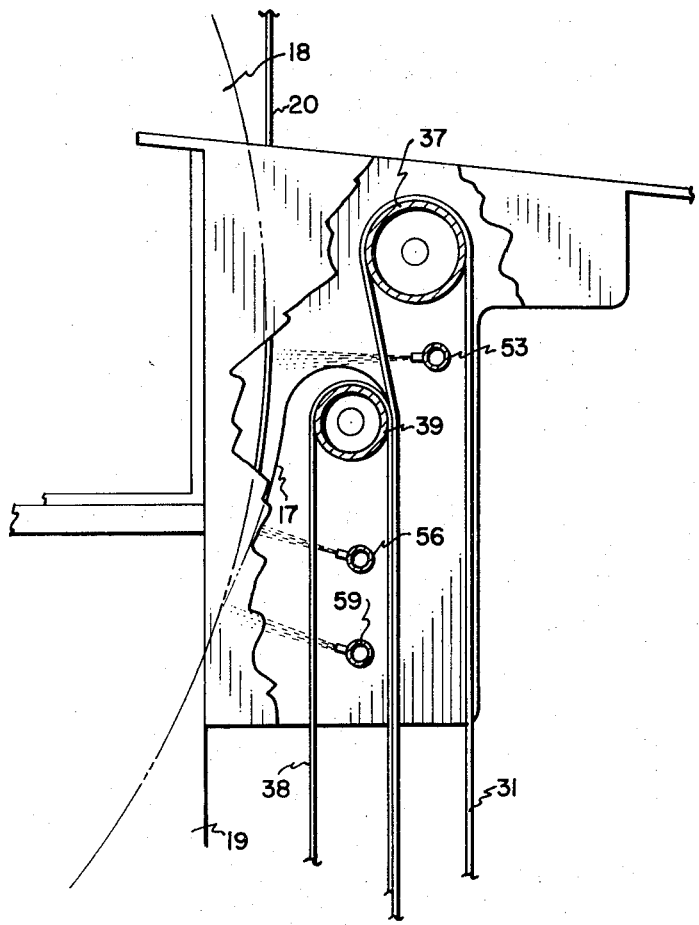
FIGS. 3 and 4 are side views of portions of the apparatus shown in FIG. 1 with the side plates removed or partially cut-away to expose the rollers and other parts.

After the sheet 17 passes the upper pulleys 39, it is subjected to the action of fluid jets, shown in detail in FIG. 3, which assist in disengaging it from the belts for feed onto the drum surface overlying the carrier belt 20 which, as will be explained hereinafter, is already in place. The jet mechanism includes a plurality of air nozzles mounted on a first manifold 53. The manifold is fixed to the frame 11 parallel to the drum axis and between the runs of the first belts 31 beneath the pulley 37. Air emitted from the nozzles pushes the filter sheet 17 downward away from the belt 31 and toward the filter drum 18. An additional air manifold 56, also mounted on the frame 11, is located beneath the pulley 39 between the runs of the inboard belts 38. That manifold has a plurality of longitudinally spaced nozzles arranged to direct jets of air against the filter sheet to urge it away from the belts 38 and toward the drum.

It has been found advantageous to dampen the sheet 17 with a fine spray of water just before it contacts the drum surface as this improves its adherence to the filter surface and carrier belt 20. As illustrated, a manifold pipe 59 having a plurality of longitudinally spaced nozzles is mounted on the frame 11 in a position to spray the sheet at about the point where it first contacts the carrier belt 20 on the drum. To further aid the filter medium in adhering to the carrier belt, vacuum should be applied to the drum surface where it is contacted by the filter sheet. This is readily accomplished by proper setting of the filter valve.

After the filter medium sheet 17 has been placed onto the carrier belt which overlies the filter drum as hereinbefore described, the sheet moves with the drum as it rotates into and out of submergence through tank 19. During submergence, filtrate is drawn through the filter medium into pipes in the drum 18 by the applied vacuum thus leaving a cake of solids on the filter medium. As the drum rotates out of submergence, the filter medium and filter cake travel on the carrier belt 20 to discharge.

As shown in FIG. 1, the filter cake discharge section includes a plurality of idler rollers 61–67 mounted on a frame 68 extending from the tank 19. The carrier belt 20 is trained about the drum and rollers to pass successively thereover. As is usual, a return roller 67 is mounted closely adjacent the drum face and is journalled in adjustable bearings to maintain proper tension on the belt. Outboard roller 61 is the discharge roller and as the carrier belt passes thereover, it makes a sharp turn at which point the disposable filter medium and accumulated filter cake fall from the belt. In the illustrated arrangement, a shredder mechanism 71 is mounted on the filter frame 68 beneath the discharge roller 61. The shredder comprises a hopper 72 to receive the cake and belt and a rotatably mounted spiked shaft 73 which is rotated by suitable drive means (not shown) at a speed to break up the cake and disposable sheet after which they fall from the bottom of the hopper 72 onto a conveyor belt not shown but which may be of any suitable type, for transport to disposal or further process.

Although the present invention has been described in conjunction with the rotary drum vacuum filter, it may be readily understood that the disposable filter medium feed mechanism described hereinbefore may be adapted to automatically feed disposable filter medium onto the carrier belts of other types of filtration devices, such as horizontal filters or the like. In this connection, it will be appreciated that the invention is not limited to use on belt filters but may be advantageously employed in conjunction with straight drum or other type filters in which the disposable web forms the belt.

For instance, in the illustrated embodiment, if the belt 20 is omitted then the paper 17 would be the only belt and would be required to support the cake during the discharge cycle. This it could do if the web were of strong enough material. Such an arrangement is not the equivalent of the illustrated embodiment which utilizes a permanent carrier belt, but is useful under certain conditions where an exceptionally strong disposable web is available. On the other hand, the use of the permanent carrier belt according to this invention, makes possible the use of inexpensive, low-strength paper as the disposable medium.

It will be appreciated that as described the invention in its simplest form comprises a filter section, a web container spaced from the filter section, a first pair of rolls one roll of which is located adjacent the web container and the other roll of which is located adjacent the filter section, a second pair of rollers located similarly to the first pair, an endless belt trained separately about each of the pairs of rollers, the rollers being arranged to form a nip adjacent the web container for accepting the web and to effect converging of the belts downstream from the web so they will come close enough together to grip a web between them for transport to the filter.

I claim:

1. A rotary drum vacuum filter comprising a filter tank, a cylindrical drum journalled for rotation in said tank, a drainage deck on said drum, means for applying a vacuum to said drainage deck, and means for continuously feeding a web of disposable filter web onto the outer surface of said drainage deck for rotation through said tank with said drum and for subsequently removing said web from said drainage deck for discharge, said last named means comprising a frame remote from said drum for rotatably supporting a roll of filter medium web, a plurality of rollers with axes substantially parallel to the axis of said drum, said rollers including:
   a. a first pair of rollers of which one roller is mounted adjacent said drum and the other roller is mounted adjacent said frame, at least one endless belt trained to pass successively about said first pair of rollers whereby said belt extends from a location adjacent said frame to a location adjacent said drum;
   b. a second pair of rollers, one roller of which is located adjacent the drum and the other roller of which is located adjacent said frame and an endless belt trained to pass successively about said rollers to extend between said frame and an endless belt trained to pass successively about said rollers to extend between said frame and said drum; and
   c. said first and second pairs of rollers being positioned relative to each other so that their associated belts are arranged in converging face-to-face relationship adjacent said frame thereby to provide a nip to accept a web introduced therebetween and from which nip said belts converge into closely spaced relationship thereby to grip between them a filter web to transport the same from said frame to a location adjacent said drum, means for disengaging said web from said belts adjacent said drum and directing said web onto said drainage deck for rotation therewith through said tank, belt means for guiding said web from said drainage deck to discharge after emergence from said tank, and means for driving said drum and said rollers with their associated belts at substantially the same speed.

2. A filter according to claim 1 wherein said one roller of one of said first and second pairs of rollers is mounted to move towards and away from the surface of a roll of filter web when the latter is rotatably supported in said frame and means are provided for urging said one roller toward the surface of said roll of filter web whereby to bring into contact with said surface a portion of the endless belt trained about said one roller.

3. A filter according to claim 2 in which said means for disengaging said filter web from said endless belts comprises at least one nozzle located adjacent the drum and arranged to direct pressure fluid against the surface of said web after it emerges from between said belts adjacent said drum to urge said web away from said belts toward said drainage deck.

4. In a filter of the type which has an endless porous belt trained between a filter section and the rollers of a cake discharge section spaced therefrom; the improvement of means for feeding a continuous sheet of filter medium onto and removing it from said filter section, said means comprising:
   a. a frame in fixed position relative to said filter and including means for supporting a supply roll of disposable filter medium to rotate freely about a horizontal axis;
   b. a plurality of levers, each of which is pivotally mounted on the frame adjacent to said supply roll to pivot one end on one side of the pivot point towards and away from the supply roll, said one end of each of said levers being of length greater than the maximum radius of said supply roll;
   c. means mounted on said frame operable on said lever to urge said one end toward the supply roll;
   d. rollers spacedly mounted on said one end of said lever;
   e. at least one first endless belt trained to travel along said one end of each of said levers on said rollers, said belt being arranged so that the outer surface thereof cradles the supply roll when said lever is pivoted theretoward, thereby to rotate the supply roll through frictional engagement therewith to unwind filter medium from the supply roll and carry the medium at least a short distance along said first endless belt, said first endless belt further being supported from said frame and trained to run from said lever to a position adjacent the filter device;
   f. at least one second endless belt supported and arranged on said frame to move face-to-face with a corresponding one of said first belts to grip the unwound filter medium therebetween and to carry it to said filter;
   g. means connected to said frame where the first and second endless belts begin their return run from the filter for disengaging the sheet of filter medium from said first and second endless belts and urging it toward said endless belt on the filter;
   h. means to drive said first and second endless belts as well as the endless belt of the filter all at the same speed.

* * * * *